Feb. 11, 1964 T. G. HART ETAL 3,121,153
TEMPERATURE REGULATION SYSTEMS
Filed May 1, 1961 2 Sheets-Sheet 1

THOMAS G. HART
JOHN E. OLBRYCH
INVENTORS

BY Allen D. Redfield
Melvin E. Frederick
ATTORNEYS

3,121,153
TEMPERATURE REGULATION SYSTEMS
Thomas G. Hart, West Acton, and John E. Olbrych, Salem, Mass., assignors to Avco Corporation, Cincinnati, Ohio, a corporation of Delaware
Filed May 1, 1961, Ser. No. 114,272
17 Claims. (Cl. 219—19)

The present invention relates to temperature regulation systems and more particularly, to temperature controlled crystals.

While the present invention is shown and described as applied to piezoelectric crystal control systems, it is to be understood that the invention is not, however, in its broader aspects limited to such crystal bodies, but may be applied to other objects of relatively small volume wherein it is desired to maintain them at constant temperatures. Such objects include, for example, any substance or arrangement, whether or not crystalline in character, that is endowed with the property of changing shape or dimension under the action of an electric force or an electric current, or a device used for reference purposes and which is kept at a selected and constant temperature. The embodiment of the present invention, therefore, as applied to piezoelectric crystals is to be considered in an illustrative rather than any limiting sense.

Piezoelectric crystals have been widely used in various types of electronic equipment for precise control of the frequency of oscillation. They have also been used as elements in narrow band filters and for a variety of other purposes in which the ability of the crystals to resonate sharply is of primary importance.

The effectiveness of the piezoelectric crystal for such purposes depends upon the accuracy with which the crystal temperature is maintained. While certain cuts of crystals have been developed which have a very low temperature coefficient over a substantial range of temperatures, nevertheless, the dependency of frequency upon temperature remains great enough so that temperature control effective to a fraction of a degree is necessary whenever a high degree of precision is required at the desired frequency. The requirements of such temperature controlled crystal units with respect to the heating power for maintenance of a constant crystal temperature are, for fixed installations, of relatively minor importance. However, in those cases where a considerable degree of mobility is required and where weight and space considerations are important, the use of the temperature controlled crystal has been seriously handicapped.

Thus, while crystal controlled oscillators and the like constitute a part of the equipment on aircraft, missiles, satellites and the like, the requirement of such applications quite often appear incompatible. Consider, for example, the requirement of a maximum degree of stability in addition to the requirements that the device weigh as little as possible, occupy a minimum amount of space, consume a minimum amount of power, and successfully withstand impulses and shocks.

A particular need for numerous applications is an oscillator with frequency stability of about one part in $10^7$ per day that has low-power consumption, and requires a very short warm up time.

Warm up time and power consumption are determined mainly by the method used to maintain the crystal at operating temperature. Two techniques are currently in use: One technique consists of enclosing the crystal envelope in a heavy thermal jacket which, because of its high thermal capacity, allows only very slow temperature changes. This arrangement produces an oscillator of excellent stability but requires, among other things, an excessive warm up period. Depending upon the stability attained, the warm up period may extend anywhere from 30 minutes to 24 hours.

The other technique dispenses with the heavy thermal jacket in order to obtain a quick warm up. The heater coil is placed directly around the crystal envelope without an intervening jacket so that the crystal temperature responds quickly to the heating coil. To reduce the warm up period further, a larger than normal amount of power may be used to start from cold. Even with high starting power, three to four minutes are generally needed to obtain stable operation due to temperature fluctuations. Considerable temperature gradients are incurred by this method of heating, therefore, it is difficult to measure and maintain crystal temperature accurately. Thus, the system does not have good frequency stability. As with the aforementioned heat sink technique, considerable power is needed to maintain oven temperature without elaborate heat insulation. Insulation, especially of the widely used vacuum jacket type, results in an increase in size and makes maintenance difficult.

There are, of course, compromises of the two main techniques, which produce oscillators of intermediate characteristics. An example of such a compromise is illustrated by Patent 2,969,471, issued Jan. 24, 1961.

In accordance with a preferred embodiment of the present invention, there is provided an elongated, evacuated chamber, the inside surface of which is a double paraboloid, a radiant heating element mounted within the chamber so as to radiate mainly at the two focal points of the inner surface, and a reflection system for focusing the heat radiated by the heating element. The element to be controlled, such as, for example, a quartz crystal, is mounted on one side of the heating element, and a blank, such as, for example, a quartz blank having substantially the same thermal characteristics and of substantially the same shape, size, orientation, and surface finish as the control crystal, is mounted in identical fashion on the opposite side of the heating element. A heat sensing element, such as, for example, a thermistor, is associated and in intimate contact with the blank so that it receives a minimum amount of direct radiant heat from the heating element. The focusing system includes a highly reflective surface on the inner wall of the chamber and reflectors adjacent to the extreme ends of the chamber. The heating element and the reflection system, which focuses the heat on the control element and blank, are arranged so that a uniform flux of heat energy is incident upon both of the major surfaces of the control element and identically upon both of the major surfaces of the blank carrying the heat sensing element. The oscillator circuit controlled by and coupled to the crystal element and proportional temperature control circuitry controlled by and coupled to the heat sensing element may be located on printed boards or the like located adjacent to the outside surface of the extreme ends of the chamber. This permits minimum separation of the control element and the blank from their respective circuits, maximum separation of these circuits one from another in the smallest possible volume, and easily accessible frequency and temperature controls.

It is, therefore, an object of the present invention to provide an improved temperature regulation system.

Another object of the present invention is to provide a temperature regulation system having a fast reaction time.

Another object is to provide a temperature regulation system for crystals and the like for which the heating power requirement is a small fraction of that required with many prior art crystal temperature controlling means.

Another object of the present invention is to provide a temperature regulation system which maintains a control device within desired temperature limits.

A further object of the present invention is to provide a temperature regulation system which is of simple and inexpensive construction and which is easy to service and maintain.

A still further object of the present invention is to provide a rugged piezoelectric crystal temperature control system that provides a high degree of stability, that is small in size and weight, and that consumes a small amount of power.

The novel features that are considered characteristic of the present invention are set forth in the appended claims; the invention itself, however, both as to its organization and method of operation, together with additional objects and advantages thereof, will best be understood from the following description of a specific embodiment when read in conjunction with the accompanying drawings in which:

Figure 1:
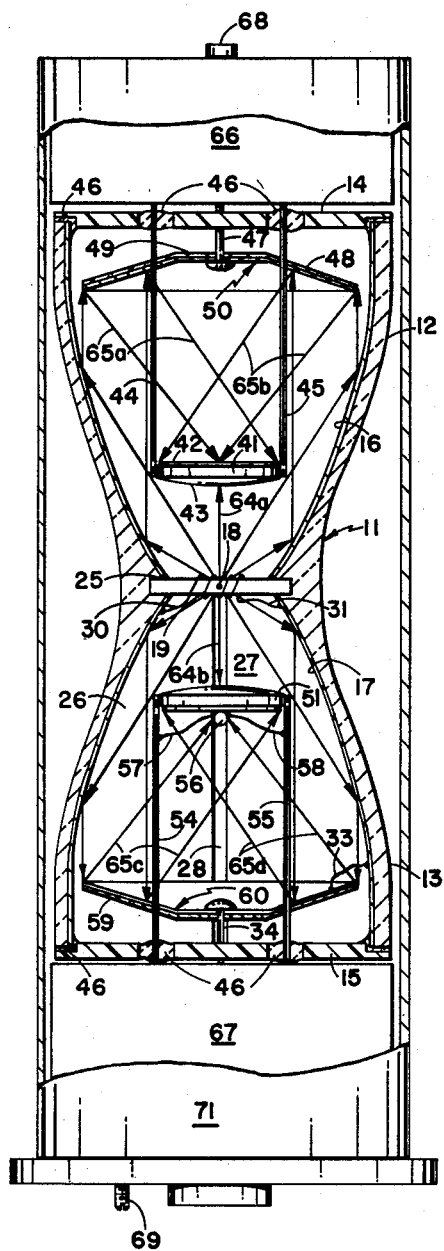
FIGURE 1 is a sectional view of a temperature regulation system according to the invention.
Figure 3:
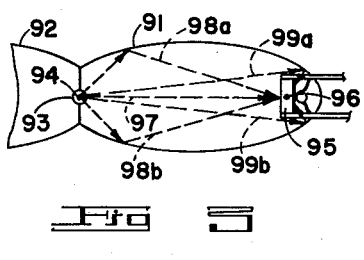
FIGURE 3 is a diagrammatic illustration of another embodiment of the invention.
Figure 4:
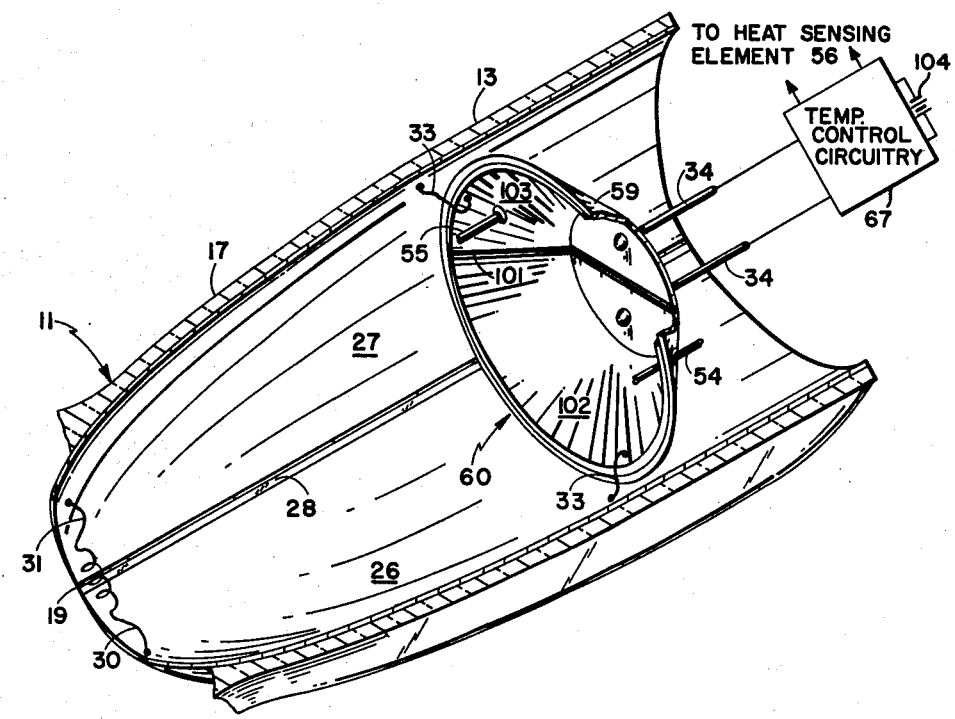
FIGURE 4 is a fragmentary sectional view with parts removed illustrating the focusing system which also forms part of the heater circuit.

With reference now to FIGURE 1, there is shown a hollow dielectric chamber 11, such as glass, comprising two oppositely directed cups 12 and 13 communicating one with another at their apexes and closed by walls 14 and 15 at their large ends. Thus, chamber 11 comprising cups 12 and 13, which include reflectors 16 and 17, may be said to have an hourglass configuration. Chamber 11 is provided with an interior reflecting surface which forms oppositely directed convex reflectors 16 and 17. The reflectors 16 and 17 may be of any suitable configuration, such as a double paraboloid as shown in FIGURE 1, or a double ellipsoid as shown in FIGURE 3. As illustrated by way of example, in FIGURE 1, the reflectors 16 and 17 are paraboloids, the focal points of which coincide at point 18. The reflectors 16 and 17, which are effectively back-to-back, are concentric about the longitudinal axis of chamber 11 and thus terminate at their small ends about a plane perpendicular to the longitudinal axis of chamber 11 and passing through their focal points, i.e., point 18. At the focal points is disposed a heater or heating element 19 which may be electric resistance wire, such as Nichrome. The heater 19 is supported or wound on a dielectric rod 25, the ends of which are embedded in or bonded to the chamber at the junction of the reflectors 16 and 17. As will be obvious to those skilled in the art, the heater leads may be brought out through the sidewall of the chamber 11 through or adjacent rod 25 in conventional manner for connection to a suitable current source. However, the preferred arrangement for energizing the heater, more fully described in connection with FIGURE 4, is to form one of the reflectors, such as, for example, reflector 17, of an electrically conductive material comprising discrete portions 26 and 27 insulated one from another by oppositely disposed regions 28 (only one of which is shown), serially couple the portions 26 and 27 to respectively the heater leads 30 and 31 and to conductors 33 which in turn are coupled to supports 34 that pass through end wall 15 of the chamber, and connect the exposed ends of supports 34 to a suitable source of current. The principal advantage of this arrangement is that it obviates the necessity of passing special heater leads through the sidewall of the chamber and providing dependable vacuum seals at these points.

A control element, illustrated in FIGURE 1 as comprising a standard disc type of piezoelectric crystal wafer 41, widely used in electronic devices, provided with electrodes 42 and 43 disposed on the opposite major surfaces of the crystal in conventional manner, is supported by electrically conductive supports 44 and 45 which pass through the end wall 14. End wall 14 is bonded to the chamber 11. Supports 44 and 45 are preferably of small diameter and/or coated with a reflective material to reduce heat absorption and are electrically connected to the electrodes 42 and 43 in conventional manner. On the other hand, the crystal 41 is preferably provided with a dark surface to increase heat absorption. Conventional low temperature sealing techniques well-known in the vacuum tube art may be used to bond the end walls 14 and 15 to the chamber 11 and provide dependable vacuum seals 46 at the various points where the supports are brought out of the chamber and the end walls meet the chamber.

Supported between the crystal 41 and the end wall 14 by two metal supports 47 (only one of which is shown in FIGURE 1) is a generally frusto-conical member 48 closed at one end 49, the closed end 49 being adjacent to end wall 14. Member 48, which may be formed of a suitable dielectric material, such as glass, is provided with an interior reflective surface 50 which cooperates with reflector 16 to uniformly reflect heat energy from the heater 19 on the side of the crystal remote from the heater.

In accordance with the present invention, it is preferable that the configuration, arrangement, and location of parts in reflector 17 be essentially identical to the configuration, arrangement, and location of parts previously described hereinabove in connection with the reflector 16. Thus, a blank 51 having substantially the same thermal characteristics, size, shape, orientation, and surface finish as the crystal 41 is supported in the reflector 17 by supports 54 and 55. The blank 51 is located in substantially the same manner, position, and orientation with respect to the heater 19 as is the crystal 41 to provide substantially identical arrangements in each reflector. A heat sensing element 56, such as, for example, a thermistor, is bonded to the shielded major surface of blank 51, i.e., the surface remote from the heater 19. Electrical connection to the heat sensing element 56 is provided through conductors 57 and 58 and supports 54 and 55. Similarly, a member 59 identical to member 48 is supported by supports 34 between the blank 51 and end wall 15. When the blank is of sufficient size, the heat sensing element 56 may, if desired, be embedded in the blank, and, in any event, is shielded from direct radiation from the heater 19.

The configuration of member 59 and the location, orientation, and the configuration of its inner surface 60 are essentially identical to that of member 48 and surface 50. One difference, however, is that the surface 60, which is comprised of a reflective and electrically conductive material is not continuous and is comprised of discrete portions insulated one from another. Suitable insulation may be provided by spacing the edges of each portion a small distance apart, as best shown in FIGURE 4. It is desirable that this spacing be as small as possible to achieve maximum heat reflection and minimum heat loss.

On the other hand, members 48 and 59 need not necessarily be constructed as shown and described hereinabove. Their presence and/or configuration, of course, depends on the configuration of the reflectors 16 and 17. Further, members 48 and 59 may be open at both ends and formed of thin copper coated on their inner surfaces with a highly reflective material. Forming members 48 and 59 to omit their closed ends may be attractive if minimum capacitance between member 48 and crystal 41 is desired, and forming members 48 and 59 of a flexible material may be attractive to facilitate assembly of the device. If, for example, thin copper is used, member 59 may be comprised of two separate copper portions bonded together with a nonconductive material and only these copper portions coated with a reflective material to permit the required insulation of the heater circuit. Obviously, supports 34 and 47 will have to be suitably relocated so that they pass through respectively surfaces 50 and 60.

Heating of crystal 41 and blank 51 is obtained by direct radiation from the heater 19 and by reflection from respectively reflectors 16 and 17 and surfaces 50 and 60. Assuming substantially identical paraboloid surfaces for reflectors 16 and 17 and substantially identical conical surfaces for surfaces 50 and 60, it will be readily seen that a substantially identical and uniform flux of heat energy from the heater 19 may be directed to both of the major surfaces of the crystal 41 and blank 51. This is clearly illustrated by arrows 64a and 64b, which represent direct radiation on the major surfaces of the crystal 41 and blank 51 exposed to the heater 19 and by arrows 65a, 65b, 65c, and 65d, which represent reflected radiation on the opposite or shielded major surfaces of crystal 41 and blank 51. The desired incidence of heat flux on the shielded major surfaces of the crystal and blank may be obtained by the use of conventional optical techniques. For example, the size of the crystal 41 having been chosen, its orientation and location with respect to the heater 19, the configuration of reflector 16, and the configuration and location of surface 50 with respect to the crystal 41 may be easily determined in conventional manner, although all are interdependent one with another. This is equally true with respect to blank 51, reflector 17, and surface 60. Thus, as may be clearly seen from FIGURE 1, heat energy incidence on most of reflector 16 is reflected to surface 50. The position of surface 50 with respect to crystal 41 and its angle of divergence is selected such that the heat energy incident thereon is reflected uniformly to the shielded major surface of the crystal 41 remote from the heater 19. Since the system is symmetrical about a plane perpendicular to the longitudinal axis of the chamber 11 and passing through point 18, the configuration and position of surface 60 is similarly selected such that heat energy incident thereon is uniformly reflected over the entire shielded major surface of the blank 51 remote from heater 19, thereby insuring that the temperature of the heat sensing element 56 is almost exactly that of the blank 51, and, hence, that of crystal 41.

The supports 34 which function to support the member 59 and permit connection of the heater 19 to a suitable source of current (see FIGURE 4) are terminated at surface 60 and are each in electrical contact with an insulated portion thereof. Supports 54 and 55, however, pass through member 59 and function to support the blank 51 and permit connection of the heat sensing element 56 to a proportional temperature control circuit. Similarly, supports 44 and 45, which function to support the crystal 41 and permit connection of electrodes 42 and 43 to an oscillator circuit, pass through member 48.

The aforementioned supports 44, 45, 54, and 55 also provide additional support for the members through which they pass. This is achieved by bonding these supports to the members 48 and 59 with a suitable nonconducting material.

The oscillator circuit or the like 66 controlled by and coupled to crystal 41 via supports 44 and 45 which extend past the outer surface of wall 14, and conventional proportional temperature control circuitry 67 coupled to the heat sensing element 56 via supports 54 and 55 which extend past the outer surface of wall 15, may be located on printed boards or the like adjacent the outer surface of respectively end walls 14 and 15, thereby permitting minimum separation of the crystal and the blank from their respective circuits, maximum separation of these circuits one from another in the smallest possible volume, and an easily accessible frequency control 68 for the oscillator 66 and temperature control 69 for the temperature control circuit 67.

The temperature regulation system and the electronic circuitry with which it may be associated are hermetically sealed in a container 71, only necessary electrical contacts and controls being exposed.

It will now be readily apparent to those skilled in the art that the present invention is equally useful for controlling the temperature of many other devices other than crystals, irrespective of their size and shape. In such cases, the blank should have, to the degree of accuracy required, the same relation to the particular device in question as blank 51 has to crystal 41. For optimum operation, the blank should be identical to the device the temperature of which it is desired to regulate. However, if the blank is identical for all practical purposes, this will be sufficient for most situations. Thus, as used in the claims the terms "control element" and "blank" are to be given their broadest interpretation.

Figure 2:
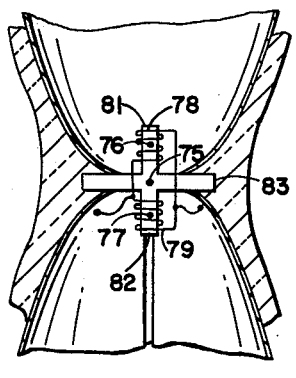
FIGURE 2 is a fragmentary sectional view showing details of the heating element where the focal points of the reflectors are not coincident.

With reference now to FIGURE 2, there is illustrated a modification wherein the focal points of the reflectors forming the inner surface of the chamber are not coincident. Thus, as shown in FIGURE 2, the apex of each reflector may, for example, be coincident at point 75, thus locating their focal points at respectively points 76 and 77. In this case, optimum radiation may be obtained by providing a heater comprised of two portions, 78 and 79, connected in parallel, each portion being symmetrical about a focal point. As illustrated in FIGURE 2, each portion 78 and 79 of the heater is mounted on opposite arms 81 and 82 of an X-shaped support member 83 composed of a suitable nonconductive material.

A further modification of the present invention is diagrammatically illustrated in FIGURE 3. As shown in this figure, reflectors 91 and 92 may be in the form of a double ellipsoid in the same manner that reflectors 16 and 17 in FIGURE 1 form a double paraboloid. In this case, the heater 93 is positioned to radiate mainly at the adjacent focal points which preferably coincide as shown at point 94, and the blank 95 is located at about focal point 96 remote from heater 93. The crystal (not shown) is similarly located at the opposite focal point remote from heater 93.

Orientation of the blank 95 (and crystal) such that its major surfaces are perpendicular to the longitudinal axis of the chamber permits direct and reflected radiation on the exposed surface of the blank, as illustrated by arrows 97 and 98a and 98b and indirect radiation on the shielded surface of the blank, as illustrated by the arrows 99a and 99b. Separate end reflectors (not shown) may also be used if desired. Orientation of the blank 95 such that its major surfaces are parallel to the longitudinal axis of the chamber permits direct and reflected radiation on the minor surface of the blank and uniform reflected radiation on the major surfaces of the blank.

There remains now only to discuss the preferred means for energizing the heater without the necessity of passing special heater leads through the sidewall of the chamber.

As shown in FIGURE 4 which is a perspective view of cup 13 comprising a portion of chamber 11 and containing the blank 51 illustrated in FIGURE 1, this is accomplished by omitting portions of reflector 17 to provide oppositely disposed regions 28, only one of which is shown. Thus, reflector 17 is comprised of two discrete and electrically conductive portions 26 and 27 insulated one from another and from reflector 16. The reflective surface 60 on member 59 is provided with a region 101 similar to region 28 to form two discrete and electrically conductive portions 102 and 103 insulated one from another. The supports 34 are located such that each is electrically connected to one of the conductive portions 102 and 103, which portions are in turn each electrically connected as by wires or spring clips 33 to one of the electrically conductive portions 26 and 27 of reflector 17. The heater leads 30 and 31 are each connected to one of the aforementioned portions 26 and 27. A source of current 104 and conventional temperature control circuitry 67 which regulate the current through the heater 19 in conformance with the temperature of the heat sensing element 56 are connected across the supports 34.

It may now be readily appreciated that there has been described a new and novel temperature regulation system comprising, for example, a crystal, a blank, a heat sensing element carried by the blank, and a source of heat interposed between the crystal and the blank, all contained in a single, evacuated glass envelope comprising a reflection system. Some of the more important features of a crystal temperature regulation system constructed in accordance with the present invention are a highly accurate measurement of crystal temperature, very fast response of crystal temperature to heater temperature, minimum power to maintain the crystal at operating temperature, and a lightweight and rugged package that occupies a minimum amount of space.

The precise construction and assembly of apparatus embodying the present invention may be efficiently and easily achieved by the use of presently known techniques for forming and low temperature vacuum sealing of glass envelopes. Thus, the inside surface of the glass envelope and the reflectors may form a highly efficient radiant heat focusing system which, in combination with a tiny radiant heat source, maintains a crystal and a heat sensing element at identical temperatures with minimum temperature gradients. Further, the heat reflecting surfaces form such an efficient radiant heat trap that a crystal may be maintained at operating temperature with a heater of very low power and without the need of external insulation.

Electronic circuitry of conventional and proven design may be combined with a crystal assembly in the manner described hereinabove so as to take full advantage of the compactness and ruggedness of the crystal assembly. The absence of a need for vacuum jacket type insulation allows the provision of a complete oscillator assembly which represents a significant improvement in size, ruggedness, and maintainability over presently available oscillator assemblies. Because only low temperature vacuum sealing techniques are required, the assembly may be easily repaired if necessary.

By way of example and not of limitation, an oscillator assembly constructed in accordance with the present invention may be capable of providing the following operating characteristics:

(1) A frequency stability of 5 parts in $10^8$ per day with a given central frequency of, for example, 5 megacycles.

(2) Frequency stabilizing times after switch-on from a completely cool start of:

1 part in $10^6$ in less than 30 seconds
    1 part in $10^7$ in less than 60 seconds
    5 parts in $10^8$ in less than 120 seconds (3) A total power consumption at $-40°$ C. (heater control, oscillator, and amplifier) of one watt, while providing an output of 0.5 volt R.M.S. into 50 ohms.

(4) A package of volume less than about 15 cubic inches.

The various features and advantages of the invention are thought to be clear from the foregoing description. Various other features and advantages not specifically enumerated will undoubtedly occur to those versed in the art, as likewise will many variations and modification of the preferred embodiment illustrated, all of which may be achieved without departing from the spirit and scope of the invention as defined by the following claims.

We claim:

1. In a temperature regulating system the combination comprising: an evacuated chamber having an hourglass configuration comprising back-to-back first and second portions; a control element positioned in said first portion; a blank substantially the same as said control element positioned in said second portion; a heat sensing element carried by said blank; an electric heating element positioned in said chamber to radiate into said first and second portions; means for directing heat energy from said heating element substantially equally on said control element and said blank; and means coupled to said heat sensing element for controlling said heating element.

2. In a temperature regulating system the combination comprising: an elongated evacuated chamber having an hourglass configuration comprising back-to-back first and second portions; a control element positioned in said first portion; a blank substantially the same as said control element positioned in said second portion; a heat sensing element carried by said blank; an electric heating element positioned in said chamber intermediate said control element and said blank to radiate into said first and second portions; means including an interior reflecting surface on the inner wall of said chamber for directing heat energy from said heating element substantially equally on said control element and said blank; and means coupled to said heat sensing element for controlling said heating element.

3. In a temperature regulating system the combination comprising: an elongated evacuated chamber having an hourglass configuration comprising back-to-back first and second portions; a control element positioned in said first portion; a blank substantially the same as said control element positioned in said second portion; at least one electric heating element positioned in said chamber intermediate said control element and said blank to radiate into said first and second portions; a heat sensing element carried by said blank and shielded from said heating element; means including an interior reflecting surface on the inner wall of said chamber for directing heat energy from said heating element substantially equally on said control element and said blank; and means actuated by said heat sensing element for controlling said heating element.

4. A temperature regulating system comprising: an elongated evacuated chamber having an hourglass configuration comprising back-to-back first and second portions; a control element positioned in said first portion; a blank having substantially the same configuration and thermal characteristics as said control element positioned in said second portion; at least one electric heating element positioned in said chamber intermediate said control element and said blank to radiate into said first and second portions, said control element and said blank being substantially equally spaced from and oriented with respect to said heating element; a heat sensing element carried by said blank and shielded from said heating element; means including an interior reflecting surface on the inner wall of said chamber for directing heat energy from said heating element substantially equally on said control element and said blank; and means coupled to said heat sensing element for controlling said heating element.

5. A temperature regulating system comprising: an elongated evacuated chamber having an hourglass configuration comprising a first portion for receiving a control element and an opposed second portion for receiving a blank, said chamber being provided on its inner wall with an interior reflecting surface forming oppositely directed back-to-back concave reflectors; a blank having substantially the same configuration and thermal characteristics as said control element; means for supporting said blank in said second portion in substantially the same position and orientation as that of said control element; an electric heating element positioned in said chamber to radiate mainly at the focal points of each of said reflectors; a heat sensing element carried by said blank and shielded from said heating element; reflecting means cooperating with said reflectors for substantially uniformly directing heat energy from said heating element on at least a majority of the surface of said control element and substantially identically on the corresponding surface of said blank; connector means for making electrical connection to said heating element and for energization thereof; and means coupled to said heat sensing element for controlling the energization of said heating element.

6. In a temperature regulating system the combination comprising: an evacuated chamber having an hourglass configuration for containing a control element and a blank substantially the same as said control element, said chamber being provided on its inner wall with an interior reflecting surface forming oppositely directed back-to-back concave reflectors; an electric heating element positioned to radiate mainly at the focal points of each of said reflectors; a heat sensing element carried by said blank; and means coupled to said heat sensing element for controlling said heating element.

7. In a temperature regulating system the combination comprising: an evacuated chamber having an hourglass configuration for containing a control element and a blank substantially the same as said control element, said chamber being provided on its inner wall with an interior reflecting surface forming oppositely directed back-to-back concave reflectors; means for positioning said control element in one of said reflectors; means for positioning said blank in the other reflector; an electric heating element positioned to radiate mainly at the focal point of each said reflector; a heat sensing element carried by said blank; and means coupled to said heat sensing element for controlling said heating element.

8. In a temperature regulating system the combination comprising: an evacuated chamber having an hourglass configuration for containing a control element and a blank substantially the same as said control element, said chamber being provided on its inner wall with an interior reflecting surface forming oppositely directed back-to-back concave reflectors; means for positioning said control element in one of said reflectors; means for similarly positioning said blank in the other reflector; an electric heating element positioned to radiate mainly at the focal point of each said reflector; a heat sensing element carried by said blank and exposed to a minimum amount of direct radiation from said heating element; and means coupled to said heat sensing element for controlling said heating element.

9. In a temperature regulating system the combination comprising: an evacuated chamber having an hourglass configuration, said chamber being provided on its inner wall with an interior reflecting surface forming similar oppositely directed back-to-back concave reflectors; a control element; means for supporting said control element in one of said reflectors; a blank substantially the same as said control element; means for supporting said blank in the other reflector in substantially the same position as said control element; at least one electric heating element positioned to radiate mainly at the focal point of each said reflector; a heat sensing element carried by said blank and shielded from said heating element; and means coupled to said heat sensing element for controlling said heating element.

10. The combination as defined in claim 9 wherein said focal points substantially coincide one with another.

11. The combination as defined in claim 9 wherein the distance between the focal point and apex of each reflector is substantially equal and the said apexes substantially coincide one with another.

12. The combination as defined in claim 9 wherein said reflectors are parabolic in shape.

13. The combination as defined in claim 12 and additionally including separate reflecting means spaced from the sides of said blank and control element remote from said heating element cooperating with said reflectors for substantially uniformly reflecting heat energy from said heating element on the sides of said blank and control element remote from said heating element.

14. The combination as defined in claim 9 wherein said reflectors are ellipsoid in shape, said heating element radiates mainly at the adjacent focal points of said ellipsoids, and said blank and said control element are each located at about one of the remote focal points.

15. The combination as defined in claim 9 wherein said reflecting surface is electrically conductive and comprised of discrete portions insulated one from another; and additionally including connector means including portions of said reflecting surface for energizing said heating means.

16. In a temperature regulating system the combination comprising: an evacuated chamber for containing a control element; a blank substantially the same as said control element disposed in said chamber; first means for radiating heat energy disposed in said chamber; second means for directing heat energy radiated from said first means substantially equally on said control element and said blank; heat sensing means carried by said blank; and third means actuated by said heat sensing means for controlling said first means.

17. In a temperature regulating system the combination comprising: an evacuated chamber for containing a control element; a blank substantially the same as said control element disposed in said chamber; first means means for radiating heat energy disposed in said chamber; second means for directing heat energy radiated from said first means substantially equally on said control element and said blank; heat sensing means carried by said blank and shielded from said first means; third means actuated by said heat sensing means for controlling said first means; and connector means for electrically interconnecting said first means, said heat sensing means and said third means.

References Cited in the file of this patent

UNITED STATES PATENTS

| | | |
|---|---|---|
| 2,791,706 | Font | May 7, 1957 |
| 2,969,471 | Schneider | Jan. 24, 1961 |

FOREIGN PATENTS

| | | |
|---|---|---|
| 789,345 | Great Britain | Jan. 22, 1958 |